Figure 1:
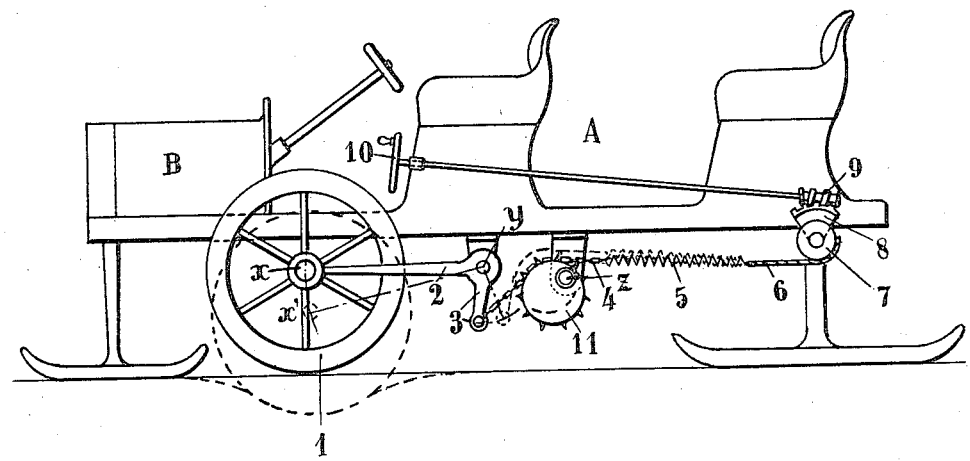

M. A. J. DE LA BESSE.
PROPELLER FOR AUTOMOBILE SLEIGHS.
APPLICATION FILED MAR. 7, 1911.

1,032,120.

Patented July 9, 1912.

WITNESSES:
John C. Sanders
Albert F. Heuman

INVENTOR:
Marie Antoine Jean de La Besse,
BY
ATTY.

UNITED STATES PATENT OFFICE.

MARIE ANTOINE JEAN DE LA BESSE, OF PARIS, FRANCE.

PROPELLER FOR AUTOMOBILE-SLEIGHS.

1,032,120.  Specification of Letters Patent.  Patented July 9, 1912.

Application filed March 7, 1911. Serial No. 612,938.

*To all whom it may concern:*

Be it known that I, MARIE ANTOINE JEAN DE LA BESSE, citizen of the Republic of France, residing at 4 Avenue Percier, Paris, France, have invented new and useful Improvements in Propellers for Automobile-Sleighs, of which the following is a specification.

This invention consists in an improvement in the means of suspending the propulsion devices in mechanically propelled vehicles. This improvement applies more particularly to automobiles, which being intended to be drawn over snow or ice are mounted on runners and propelled by toothed or grooved wheels or by ordinary wheels of any kind furnished with devices suitable for giving the wheels a sufficient support for enabling them to perform their propelling action on snowy or icy ground.

The difficulty of propelling automobiles mounted on runners is owing to the fact that the propelling devices not being likewise the bearing devices, the adhesion of the propelling devices is liable to extreme variations, in certain cases it is insufficient, while in other cases it causes strain which exceeds the limit of resistance of the propellers, causing a sudden stopping of the vehicle, and considerably increasing the resistance to the forward movement.

If the propellers are loaded so as to give them a fixed degree of adhesion on horizontal ground, by suitably regulating the suspension device, it will be observed that the variations in the load and consequently the variations in the adhesion of the propellers on the back are too great to allow of vehicles being propelled by employing, for the propellers, the suspension devices ordinarily used in automobile carriages, whatever the initial load for which the suspension device has been regulated. This is due to the fact that snow tracks are very variable, such tracks being formed in some cases of soft snow and in others of ice, with all the intermediate stages of congealed water. The crevices, cavities, knolls and rough places are also more numerous so that there are far more uneven places than are met with on macadamized roads. And when, for example a propeller of an automobile with runners sinks in a crevice in the track, it loses the whole or a part of its load, the vehicle being borne by runners which take support either on the edges or completely outside of the hole in which the propeller has plunged. The same result might be produced in case the vehicle were not borne on runners but by two pairs of wheels and propelled by a third pair of wheels.

It is evident that if the driver were allowed to regulate at will the load of the suspension device for the propellers, for example by stretching or slackening the springs of this suspension device by means of screw gearing that could be operated by hand as has been already proposed, the desired object would not be attained. The driver cannot in fact operate quickly enough to impart to the suspension device the tension corresponding at any moment to the suitable adhesion. This primitive means can only be regarded as an artifice intended for putting the vehicle in a position to resume running when it has been stopped in consequence of unevenness of the surface or the nature of the ground.

According to the present invention, the disadvantages and the causes of accident indicated are avoided by providing a suspension device which automatically insures a uniform pressure or a very slightly variable pressure of the propellers on the ground, these latter encountering the uneven places or places of variable consistency that appear in snow tracks.

This invention consists in providing means for automatically holding the propeller member against the ground with a constant pressure irrespective of the contour of the ground over which the vehicle travels.

Figure 2:
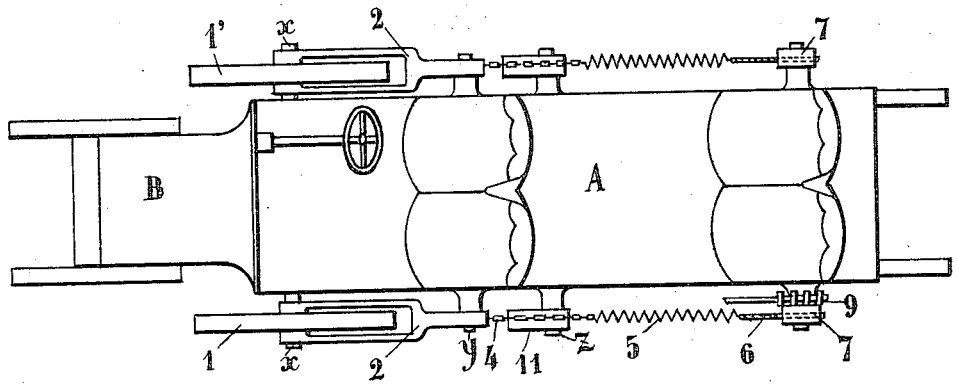

A form of construction of the present invention is illustrated in the accompanying drawing, in which, Figure 1 is a side elevation of a sleigh with runners, provided with driving wheels with elastic suspension to which is added the equalizing device which forms the subject matter of the invention, said suspension being so arranged that it can be differently set by the driver of the sleigh. Fig. 2 is a plan view.

Under frame A of a sleigh of any desired construction are placed a pair of driving wheels 1, 1' (one driving wheel placed in the middle of the sleigh will answer the purpose), adapted to be driven by the motor which is situated under hood B in the usual manner. Each of the said driving wheels is pivoted at $x$ between the arms of a fork 2, which is oscillatingly supported at $y$ and which has a bracket 3 connected by a chain 4 to the forward end of a spring 5. The rear end of this spring is provided with a chain or cable 6 winding on drum 7, the spindle of which carries a toothed segment 8 engaging with a worm 9, which is adapted to be rotated by a wheel 10 under the control of the driver. Below the chain 4, and in engagement with its links, is a spurwheel 11 eccentrically mounted on a spindle z so as to act for a cam. Instead of being in engagement with spurwheel 11, the chain 4 may be fastened or attached to any point of the periphery of said wheel. The axis of oscillation y of the fork 2, the axis of drum 7 and the axis z which supports the spurwheel 11 are all mounted on supports fixed in any suitable manner, for instance, below the frame A of the sleigh.

The initial tension of the spring 5 is regulated by the driver, by means of the wheel 10 and the transmission in engagement therewith, in such a manner that there is produced on the fork 2, and in consequence on the driving wheel 1, sufficient stress to force the wheel against the ground with a pressure determined by the character of the vehicle and the road, that is, the weight of the wagon, its pressure, the power of the motor, the steepness of the road etc. When the driving wheel 1, which is pressed against the ground with a pressure determined by the tension of spring 5, strikes a hole of soft snow, it will sink in, while the frame A of the sleigh, supported by the runners, will not change its line. The center of the driving wheel, originally at $x$, sinks to $x'$, for instance, thus compelling the suspension fork 2 to swing around point $y$ and to take the position, indicated by the dotted line. Under these conditions, chain 4 becomes loose and spring 5 loses the tension originally given to it. But now chain 4, which engages the spurwheel, compels it to turn on its axis $z$ and to take the position indicated by the dotted line, thereby producing a restretching of the spring 5. It will be seen, therefore, that the spurwheel or cam 11 plays the role of an equalizing shackle by virtue of its eccentricity, which is so established that the tension of chain 4, or of a perforated band, which is equal to the tension of spring 5, remains constant or nearly so, relatively to the variations in the position of driving wheel 1, which are produced by the unevenness or the difference in consistency of the ground. It is evident that the wheel or cam 11 may be replaced by any other device, serving the same purpose, without any inconvenience and without departing from the principle of the invention.

I claim—

1. In a motor vehicle, in combination, a body, an arm oscillatingly mounted thereon, a propelling member rotatably supported upon said arm, and automatic means for holding said member against the ground with a constant pressure irrespective of the contour of the ground traveled over by the vehicle.

2. In a motor vehicle, in combination, a body, an arm oscillatingly mounted thereon, a propelling member rotatably supported upon said arm, automatic means for holding said member against the ground with a constant pressure irrespective of the contour of the ground traveled over by the vehicle, and manually controlled means for varying the pressure with which said member engages the ground.

3. In a motor vehicle, in combination, a body, an arm oscillatingly mounted thereon, a propelling member rotatably supported upon said arm, a spring operatively connected to said arm and holding said member against the ground, and means for maintaining constant the tension of said spring, whereby the pressure of said member upon the ground will be constant.

4. In a motor vehicle, in combination, a body, an arm oscillatingly mounted thereon, a propelling member rotatably supported upon said arm, a spring operatively connected to said arm and holding said member against the ground, and a cam device operatively connected with said spring and adapted to be actuated by the oscillations of said arm to maintain constant the tension of said spring, whereby the pressure of said member upon the ground will be constant.

5. In a motor vehicle, in combination, a body, a bell crank oscillatingly mounted thereon, a propelling member rotatably mounted on the free end of one of the arms of said bell crank, a chain having one of its ends connected to the free end of the other of the arms of said bell crank, a spring having one end fixed and the other end connected to the other end of said chain, and a spurwheel eccentrically mounted beneath said chain and engaging therewith.

In testimony whereof I have signed my name to this specification in the presence of two subscribing witnesses.

MARIE ANTOINE JEAN DE LA BESSE.

Witnesses:
DEAN B. MASON,
MIGUEL FEROLO.

---

Copies of this patent may be obtained for five cents each, by addressing the "Commissioner of Patents, Washington, D. C."